United States Patent
Rydström et al.

(10) Patent No.: US 12,479,440 B2
(45) Date of Patent: Nov. 25, 2025

(54) RADAR-TRIGGERED ROAD FRICTION ESTIMATION

(71) Applicant: VOLVO TRUCK CORPORATION, Gothenburg (SE)

(72) Inventors: Mats Rydström, Billdal (SE); Mats Jonasson, Partille (SE); Adithya Arikere, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 53 days.

(21) Appl. No.: 18/640,640

(22) Filed: Apr. 19, 2024

(65) Prior Publication Data
US 2024/0367659 A1 Nov. 7, 2024

(30) Foreign Application Priority Data

May 1, 2023 (SE) .................................... 2330191-4
Dec. 11, 2023 (EP) .................................... 23215543

(51) Int. Cl.
*B60W 40/068* (2012.01)
*B60W 10/22* (2006.01)
(Continued)

(52) U.S. Cl.
CPC .......... *B60W 40/068* (2013.01); *B60W 10/22* (2013.01); *B60W 40/12* (2013.01);
(Continued)

(58) Field of Classification Search
CPC .. B60W 40/068; B60W 40/10; B60T 2210/12
See application file for complete search history.

(56) References Cited

U.S. PATENT DOCUMENTS

| 3,363,253 A | 1/1968 | Ratkevich et al. |
| 4,845,506 A | 7/1989 | Shibata et al. |

(Continued)

FOREIGN PATENT DOCUMENTS

| DE | 102012220238 A1 | 5/2014 |
| DE | 102017210964 A1 | 1/2019 |

(Continued)

OTHER PUBLICATIONS

Extended European Search Report dated May 14, 2024 in corresponding European Patent Application No. 23215543.2, 9 pages.

(Continued)

*Primary Examiner* — Long T Tran
(74) *Attorney, Agent, or Firm* — Venable LLP; Jeffri A. Kaminski (57) ABSTRACT

A computer implemented method for determining a road friction condition associated with at least one wheel on a heavy-duty vehicle includes transmitting a radar signal by at least one polarimetric radar transceiver towards a surface supporting the vehicle, and receiving backscatter from the transmitted radar signal, where the radar signal comprises a first polarization component and a second polarization component different from the first polarization component, processing the received backscatter by a processing device to determine a friction parameter related to the road friction condition of the surface, monitoring the friction parameter over time to detect change in the friction parameter, and in case change in the friction parameter is detected, triggering friction estimation by a secondary physical friction estimation system.

17 Claims, 6 Drawing Sheets

(51) Int. Cl.
   *B60W 40/12*   (2012.01)
   *G01S 13/08*   (2006.01)
   *G01S 13/60*   (2006.01)
   *G01S 13/88*   (2006.01)

(52) U.S. Cl.
   CPC ............ *G01S 13/08* (2013.01); *G01S 13/605* (2013.01); *G01S 13/88* (2013.01); *B60W 2300/125* (2013.01); *B60W 2420/408* (2024.01); *B60W 2422/10* (2013.01); *B60W 2520/26* (2013.01); *B60W 2520/28* (2013.01); *B60W 2530/10* (2013.01); *B60W 2552/40* (2020.02)

(56) References Cited

U.S. PATENT DOCUMENTS

| | | | |
|---|---|---|---|
| 5,621,413 | A | 4/1997 | Lempkowski et al. |
| 11,975,722 | B2 * | 5/2024 | Jang ............... B60T 8/1764 |
| 2011/0264300 | A1 * | 10/2011 | Tuononen ............ B60T 8/172 701/1 |
| 2014/0138802 | A1 | 5/2014 | Starostine et al. |
| 2015/0371095 | A1 * | 12/2015 | Hartmann ............ G06T 7/11 348/148 |
| 2017/0254897 | A1 | 9/2017 | Tron et al. |
| 2018/0217231 | A1 | 8/2018 | Stanley et al. |
| 2020/0089243 | A1 * | 3/2020 | Poeppel ............. B60W 60/00 |
| 2020/0139976 | A1 * | 5/2020 | Magnusson ........ G01C 21/3822 |
| 2020/0231163 | A1 * | 7/2020 | Kristiansson .......... B60T 8/172 |
| 2020/0271550 | A1 * | 8/2020 | Svantesson ............ G01N 19/02 |
| 2020/0385036 | A1 * | 12/2020 | Schwarz ............. B60T 8/1705 |
| 2022/0126834 | A1 | 4/2022 | Schiffmann et al. |
| 2022/0172492 | A1 | 6/2022 | Laine et al. |
| 2023/0023411 | A1 * | 1/2023 | Laine ................ B60T 8/323 |
| 2023/0045861 | A1 * | 2/2023 | Passaniti ............ B60W 40/105 |
| 2024/0326761 | A1 * | 10/2024 | Putz ................. B60T 8/172 |

FOREIGN PATENT DOCUMENTS

| | | |
|---|---|---|
| DE | 102019202772 A1 | 9/2020 |
| EP | 0095300 A2 | 11/1983 |
| EP | 2653882 A1 | 10/2013 |
| EP | 3562702 A1 | 11/2019 |
| JP | H10288559 A | 10/1998 |
| JP | 2008170237 A | 7/2008 |
| WO | 2012087150 A1 | 6/2012 |
| WO | 2018124971 A1 | 7/2018 |
| WO | 2019209292 A1 | 10/2019 |
| WO | 2022214174 A1 | 10/2022 |

OTHER PUBLICATIONS

Thomas Gillespie in "Fundamentals of Vehicle Dynamics" Warrendale, PA: Society of Automotive Engineers, 1992, 3 pages.
Lecture notes "Introduction to mmwave Sensing: FMCW Radars" by Sandeep Rao, Texas Instruments, 2017, 70 pages.
"Tyre and vehicle dynamics", Elsevier Ltd. 2012, ISBN 978-0-08-097016-5, by Hans Pacejka, 400 pages.
Swedish Search Report in corresponding Swedish Patent Application No. 2330191-4 mailed Nov. 29, 2023 (2 pages).
Vessen Vassilev. 2022. "Road Surface Recognition at mm-Wavelengths Using a Polarimetric Radar"; IEEE Transactions on Intelligent Transportation Systems; vol. 23; Issue 7; Jul. 2022; pp. 6985-6990; https://doi.org/10.1109/TITS.2021.3066312.

* cited by examiner

RADAR-TRIGGERED ROAD FRICTION ESTIMATION

TECHNICAL FIELD

The disclosure relates generally to road friction estimation and also to vehicle motion management based at least in part on an estimated road friction. In particular aspects, the disclosure relates to radar-triggered road friction estimation methods. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Road friction plays an important part in the behavior of most vehicles, mainly since it limits the wheel forces that can be generated by the vehicle at any given point in time. For instance, the road friction coefficient $\mu$ together with normal force $F_z$ acting on a tyre limits the achievable longitudinal tyre force $F_x$ as $F_x \leq \mu F_z$. Road friction also determines how much lateral wheel force $F_y$ that can be supported by a tyre without excessive lateral wheel slip, and therefore determines how fast a vehicle can enter a road turn without driving off the road.

Drivers of manually driven vehicles are often aware, at least roughly, of current road conditions, e.g., if the road is wet or icy, and can adjust vehicle motion such as speed accordingly. However, conditions may change rapidly, and not all drivers are experienced enough to accurately determine road friction. Also, autonomous vehicles lacking a driver would of course benefit from knowing at least approximately what the road frictions conditions are before control operations are performed. Thus, methods for determining road frictions conditions are desired.

A lot of work has gone into designing methods for automatically determining road friction based on applying controlled amounts of torque by different vehicle propulsion devices. Some such examples include DE102012220238, DE102019202772 and EP3562702.

JPH10288559 and JP2008170237 also disclose methods for automatically determining road friction. These methods are instead based on applying steering to estimate road friction.

However, despite the available techniques for automatic road friction determination, there is a continuing need for more versatile and accurate methods for estimating road friction.

SUMMARY

A first aspect of the disclosure relates to a computer implemented method for determining a road friction condition associated with at least one wheel on a heavy-duty vehicle. The method comprises transmitting a radar signal by at least one polarimetric radar transceiver towards a surface supporting the vehicle and receiving backscatter from the transmitted radar signal. The radar signal comprises a first polarization component and a second polarization component different from the first polarization component, such as a vertically polarized component and a horizontally polarized component or left and right hand side circularly polarized components. The method also comprises processing the received backscatter by a processing device to determine a friction parameter related to the road friction condition of the surface. The method further comprises monitoring the friction parameter over time to detect change in the friction parameter, and in case change in the friction parameter is detected, triggering friction estimation by a secondary physical friction estimation system.

This means that known mechanical friction estimation mechanisms only needs to be actuated when needed, i.e., when road friction conditions have changed. This is an advantage since too frequent actuation of a mechanical friction estimation system may cause discomfort to a person in the vehicle, and may also result in increased component wear, such as increased tyre wear.

Change in the friction parameter can be detected using any method known in the art. A test metric determined as a function of the polarization characteristics of the received backscatter can for instance be computed and compared to some nominal value. Change is then detected if the test metric deviates by more than a predetermined amount from the nominal value. The nominal value can then be updated after change has been detected to a new nominal value, and the monitoring then continues using the new nominal value.

According to some aspects, the secondary physical friction estimation system comprises generation of a steering pulse, i.e., a quick change in steering by a steered axle, often of small magnitude, in order to probe the road surface.

The secondary physical friction estimation system may also comprise generation of a propulsion torque pulse, such as a brake torque pulse or a propulsion torque pulse.

According to some aspects, the friction parameter that is monitored over time comprises 2-port scattering parameters of the road surface at the first and second polarizations. These 2-port scattering parameters have been shown in the prior art to vary with friction. Hence, they can be used to detect a change in road friction. The friction parameter can also be related to a scatter coherence matrix of the received backscatter, to a target entropy and/or a polarimetric pedestal of the backscatter radar signal, or a combination of several different metrics and quantities that can be determined from processing the received backscatter.

The computer implemented method optionally also comprises monitoring a normal force associated with one or more wheels on the vehicle over time to detect change in the normal force, and in case change in the normal is detected, triggering friction estimation by the secondary physical friction estimation system. Normal force can be measured or estimated in several ways, such as by monitoring bellow pressure in a suspension system, by monitoring vertical displacement of the vehicle chassis relative to the road surface, by monitoring tyre pressure or effective rolling radius, and so on. If a change in normal force has been detected, such as a change in vehicle cargo weight, it may be advisable to update the friction estimate by triggering friction estimation by the secondary physical friction estimation system.

Aspects of the methods disclosed herein also relate to computer implemented methods comprising determining a wheel force generating capability of one or more wheels on the heavy-duty vehicle based on the friction estimation by the secondary physical friction estimation system. This wheel force generating capability is very useful in performing various vehicle motion management operations, as will be discussed in more detail below.

Aspects of the methods disclosed herein furthermore relate to computer implemented methods that comprise updating a tyre model based on the friction estimation by the secondary physical friction estimation system. The methods may for instance comprise updating an inverse tyre model associated with one or more wheel son the vehicle based on the estimated current road friction. An inverse tyre model describes a relationship between wheel slip and generated tyre force, and this relationship depends on the road friction. By updating the tyre model based on the friction estimation by the secondary physical friction estimation system, a more accurate tyre model is obtained.

The methods described herein may also comprise transmitting radar signals by a plurality of polarimetric radar transceivers towards the surface supporting the vehicle, and receiving backscatter from the transmitted radar signals, where each transmitted radar signal is associated with a respective wheel or group of wheels on the vehicle. By operating several polarimetric radar transceivers in this manner a wheel specific or wheel group specific road friction estimation can be performed. This increases the amount of information available for advanced vehicle control, which is an advantage.

Aspects of the present disclosure also relates to hardware devices such as control units, computer systems, and processing circuitry.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The techniques of the present disclosure will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims. Hence, many if not most of the technical features discussed below are not inextricably linked to each other but can be used separately with advantage.

Figure 1:
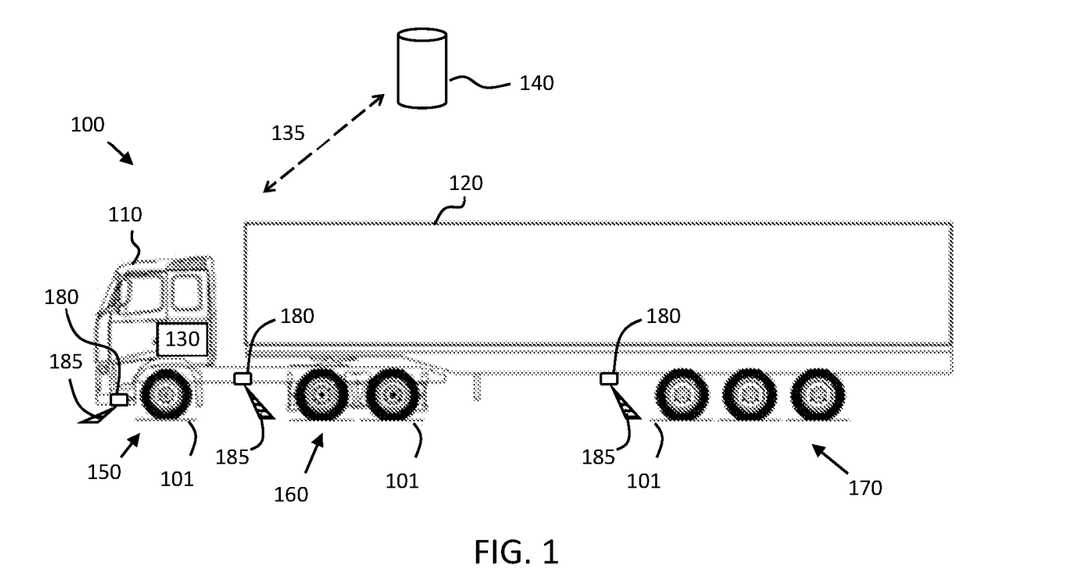
FIG. 1 is an exemplary illustration of a heavy-duty vehicle.

FIG. 1 illustrates a heavy-duty vehicle 100. This particular example comprises a tractor unit 110 which is arranged to tow a trailer unit 120 in a known manner. The tractor 110 comprises a vehicle control unit (VCU) 130 arranged to control various functions of the vehicle 100. For instance, the VCU may be arranged to perform a vehicle motion management (VMM) function comprising control of wheel slip, vehicle unit stability, and so on. The trailer unit 120 optionally also comprises a VCU, which then controls one or more functions on the trailer 120. The VCU or VCUs may be communicatively coupled, e.g., via wireless link 135, to a remote server 140. This remote server may be arranged to perform various VCU configurations, and to provide data to the VCU 130, such as data regarding the make and type of tyres mounted on the vehicle 100, as will be discussed in more detail below.

A heavy-duty vehicle may be taken to mean a motor vehicle rated at more than 8,500 pounds Gross Vehicle Weight Rating (GVWR), which is about 3855 kg. A heavy-duty vehicle may also be taken to mean a motor vehicle that has a basic vehicle frontal area in excess of 45 square feet, which is about 4.2 m2. Examples of heavy-duty vehicles include trucks, semi-trailers, and the like. It is appreciated that the herein disclosed methods and control units can be applied with advantage also in other types of heavy-duty vehicles, such as trucks with drawbar connections, construction equipment, buses, and the like.

The vehicle combination 100 may of course also comprise additional vehicle units, such as one or more dolly units and more than one trailer unit. The teachings herein can also be applied in rigid vehicles, such as rigid trucks and also in passenger cars.

The vehicle 100 is supported by wheels, where each wheel comprises a tyre. The tractor unit 110 has front wheels 150 which are normally steered, and rear wheels 160 of which at least one pair are driven wheels. The trailer unit 120 is supported on trailer wheels 170. Trailers with driven wheels, and even one or more steered axles, are also possible. The wheels of the vehicle 100 support the vehicle on a surface 101, which can be a paved surface, a gravel surface, or some other surface.

The vehicle 100 is supported on the surface 101 by the wheels 150, 160, 170, and as mentioned above, the friction between road and tyre plays an important role in determining how the vehicle 100 will respond to different control commands. For instance, in low friction conditions a given amount of applied torque may result in excessive wheel slip, while the same amount of torque applied in more favorable friction conditions will result in a smooth acceleration by the vehicle.

Road friction may be characterized in terms of the road friction coefficient, often denoted u. It is a dimensionless scalar value which describes the ratio of the force of friction between two bodies and the force pressing them together. The coefficient of friction depends on the materials used; for example, rubber on ice has a relatively low coefficient of friction, while rubber on dry road has a higher coefficient of friction.

Figure 2:
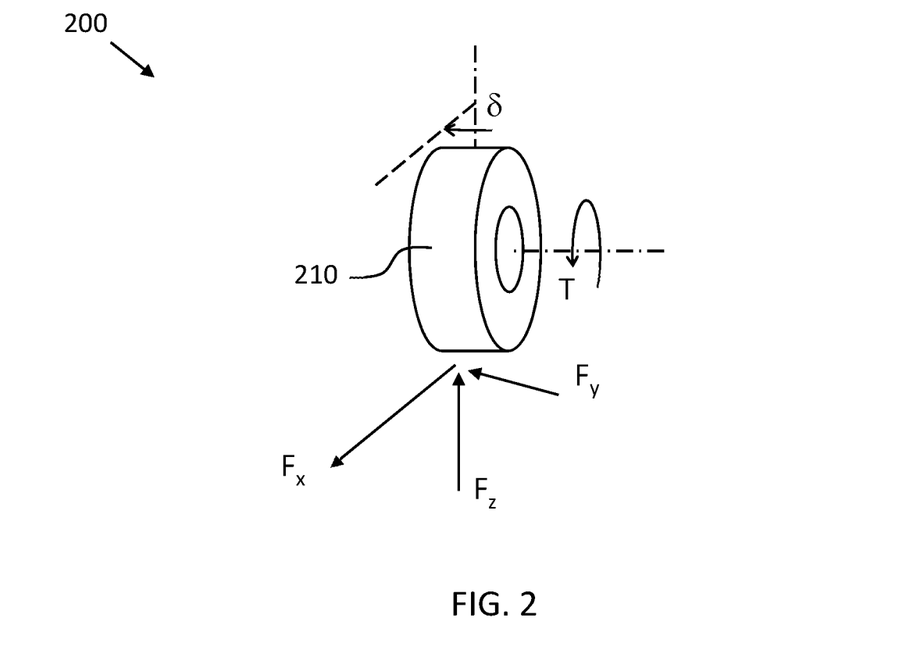
FIG. 2 shows a wheel with tyre forces.

FIG. 2 schematically illustrates a vehicle tyre 210, such as a tyre on one of the wheels 150, 160, 170 on the vehicle 100. A positive or negative torque T can be applied about its axis of rotation in order to generate longitudinal force $F_x$ to accelerate or to brake the vehicle 100. However, this longitudinal force cannot exceed the product $\mu F_z$ of the normal force $F_z$ and the road friction coefficient $\mu$. If the wheel is a steered wheel, then a steering angle $\delta$ can also be applied, which then normally generates a lateral tyre force $F_y$.

Figure 7:
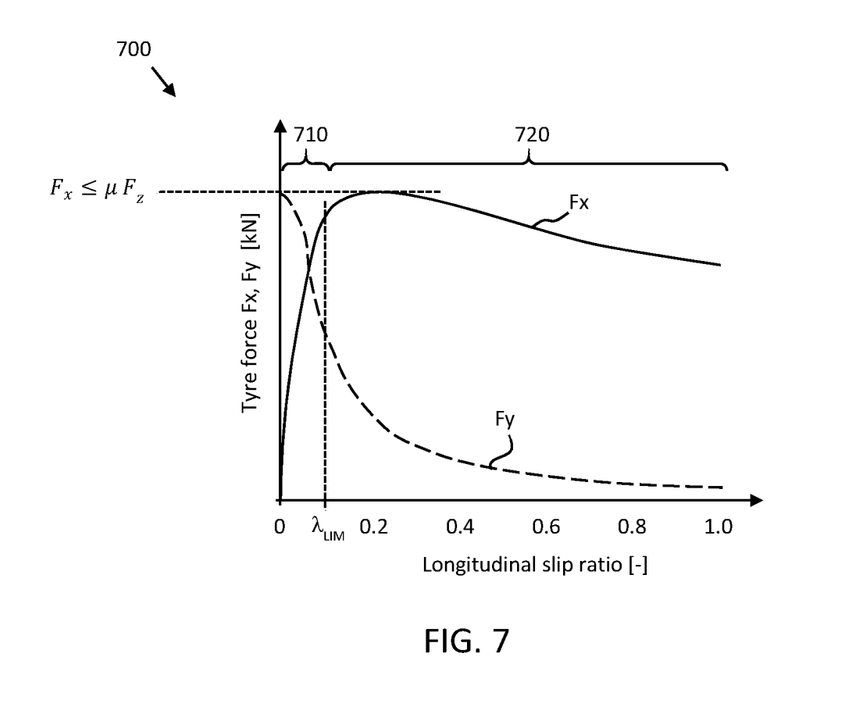
FIG. 7 is a graph illustrating example tyre forces as function of wheel slip.

FIG. 7 shows a graph 700. Herein, longitudinal speed over ground may be determined relative to the vehicle, in which case the speed direction refers to the forward direction of the vehicle or relative to a wheel, in which case the speed direction refers to the forward direction, or rolling direction, of the wheel. The same is true for lateral speed over ground, which can be either a lateral speed of the vehicle or a lateral speed over ground of a wheel relative to its rolling direction. The meaning will be clear from context, and it is appreciated that a straightforward conversion can be applied in order to translate speed over ground between the coordinate system of the vehicle and the coordinate system of the wheel, and vice versa. Vehicle and wheel coordinate systems are discussed, e.g., by Thomas Gillespie in "Fundamentals of Vehicle Dynamics" Warrendale, PA: Society of Automotive Engineers, 1992.

Longitudinal wheel slip $\lambda_x$ may, in accordance with SAE J370 (SAE Vehicle Dynamics Standards Committee Jan. 24, 2008) be defined as $$\lambda_x = \frac{R\omega_i - v_x}{\max(|R\omega_i|, |v_x|)}$$

where R is an effective wheel radius in meters, $w_i$ is the angular velocity of the i-th wheel on the vehicle 100, and $v_x$ is the longitudinal speed of the wheel (in the coordinate system of the wheel). Thus, $\lambda_x$ is bounded between −1 and 1 and quantifies how much the wheel is slipping with respect to the road surface. The two terms road surface and surface are used interchangeably herein. Both terms refer to the surface 101 supporting the vehicle 100, which is also the reference for the vehicle speed over ground in lateral and longitudinal directions. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

Slip angle $\alpha$, also known as sideslip angle, is the angle between the direction in which a wheel is pointing and the direction in which it is actually traveling (i.e., the angle between the longitudinal velocity component $v_x$ and the vector sum of wheel forward velocity $v_x$ and lateral velocity $v_y$. This slip angle results in a force, the cornering force, which is in the plane of the contact patch and perpendicular to the intersection of the contact patch and the midplane of the wheel. The cornering force increases approximately linearly for the first few degrees of slip angle, then increases non-linearly to a maximum before beginning to decrease.

The slip angle, $\alpha$ of a wheel is often defined as $$\alpha = \arctan\left(\frac{v_y}{|v_x|}\right)$$

where $v_x$ is the longitudinal speed of the wheel and $v_y$ is the lateral speed of the wheel, in the coordinate system of the wheel. It is appreciated that $v_x$, $v_y$, and $\alpha$ differs between wheels, depending on the motion of the vehicle 100. Hence, it may be advantageous to deploy wheel end modules 140 in connection to the different wheels on the vehicle 100, or in connection to the different wheel axles on the vehicle 100, in order to obtain accurate information of vehicle motion.

In order for a wheel (or tyre) to produce a wheel force which affects the motion state of the heavy-duty vehicle, such as an acceleration or a deceleration (a negative acceleration), wheel slip must occur. For smaller slip values the relationship between slip and generated force is approximately linear, where the proportionality constant is often denoted as the slip stiffness $C_x$ of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where u is a friction coefficient associated with a road friction condition. The techniques disclosed herein seek to provide wheel end modules 140, systems, and methods that determine both u and $F_z$ for at least some of the wheels 102 on the vehicle 100, and/or for one or more axles of the vehicle 100, at least approximately.

The graph 700 is an example of achievable tyre forces as function of longitudinal wheel slip $\lambda_x$. $F_x$ is the longitudinal tyre force while $F_y$ is the maximum obtainable lateral wheel force for a given wheel slip. This type of relationship between wheel slip and generated tyre force is often referred to as an inverse tyre model. The example in FIG. 7 are for positive wheel forces, i.e., acceleration. Similar relationships exist between wheel slip and negative wheel force, i.e., braking. The maximum available lateral force for a given wheel slip can be described by the so-called Magic Formula as described in "Tyre and vehicle dynamics", Elsevier Ltd. 2012, ISBN 978-0-08-097016-5, by Hans Pacejka, where wheel slip and tyre force is also discussed in detail.

An inverse tyre model can be used to translate between a desired longitudinal tyre force $F_x$ and longitudinal wheel slip $\lambda_x$. A tyre model such as that exemplified in FIG. 7 can be used to coordinate motion actuators on a vehicle, such as brakes and propulsion devices, and also steering, to obtain a desired vehicle motion. However, the tyre models will not be very accurate if the wrong road friction is assumed. By using a tyre model which is parameterized by road friction the accuracy of the mapping between wheel slip and tyre force is greatly improved. Some of the techniques disclosed herein relate to methods and systems which maintain a database of several tyre models, which can be selected from based on the current road friction. The system maintains an up-to-date road friction estimate and uses the corresponding tyre model, I.e., the tyre model which provides the correct mapping between wheel slip and tyre force given the current road friction conditions. A look-up table can be used to map road friction to tyre model. The tyre model can also be defined as a mathematical function which takes the road friction as an argument. These road friction dependent tyre models can be pre-determined by practical experimentation, perhaps completed by computer simulation.

Referring again to FIG. 7, the example longitudinal tyre force $F_x$ shows an almost linearly increasing part 710 for small wheel slips, followed by a part 720 with more non-linear behavior for larger wheel slips. It is desirable to maintain vehicle operation in the linear region 710, where the obtainable longitudinal force in response to an applied brake command is easier to predict, and where enough lateral tyre force can be generated if needed. To ensure operation in this region, a wheel slip limit $\lambda_{lim}$ on the order of, e.g., 0.1 or so, can be imposed on a given wheel. Thus, having accurate knowledge of current wheel slip, operation in the linear region can be ensured, which greatly simplifies vehicle motion control for both safety, efficiency, and driver comfort. Knowledge of current longitudinal wheel slip $\lambda_x$ together with knowledge about current wheel force generating capability, i.e., $\mu F_z$ also provides important information about the ability by a given wheel to generate lateral force. The wheel slip limit is advantageously configured as a function of the current road friction. Hence, according to some aspects the tyre model also includes control parameters such as wheel slip limit. This allows the vehicle control to be better adapted to the current road friction conditions, thereby improving vehicle safety and also efficiency.

The vehicle 100 comprises a number of sensors, such as torque sensors able to accurately detect small changes in torque about an axle such as a steering axle, inertial measurement units (IMU) which accurately measure acceleration and yaw motion by the different vehicle units, and wheel speed sensors which are able to very quickly pick up minute changes in wheel speed in response to some actuator control. It has been realized that these vehicle sensors are now becoming so sensitive and fast that the response by the vehicle even to very small magnitude and short time duration vehicle control actions can be measured and analyzed by on-board vehicle control units. This can be used for estimating road friction while the vehicle is in motion without significantly impacting vehicle behavior, since only very small control actions are required to generate vehicle response data which can then be analyzed in order to infer current road friction conditions.

In particular, road friction can be estimated from the response by the vehicle to small magnitude and short time duration steering pulses, which pulses are small enough and/or of short enough time duration so as to not affect the vehicle path significantly. Thus, road friction can be estimated independently from the propulsion system. This is an advantage since the propulsion system comprises components such as a transmission which often complicate estimation of road friction. Also, by allowing for road friction estimation based on steering, a redundant method is provided which can be used as a complement to a propulsion-based road friction estimation method.

Figure 3:
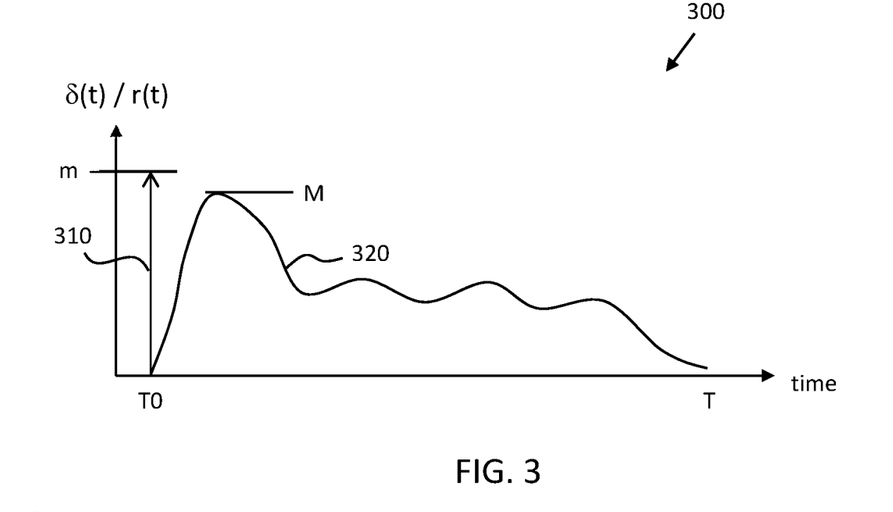
FIG. 3 shows a graph which illustrates an applied steering pulse.

FIG. 3 shows a graph 300 which illustrates the general concept. A steering pulse d(t) 310 is generated at time TO. This steering pulse 310 comprises a temporary and small change in steering angle from some nominal value, preferably but not necessarily followed by a more or less immediate reversal of the steering angle back to the nominal value. The response r(t) 320 by the vehicle to this steering pulse is then recorded and subject to analysis in order to discern the current road friction conditions. Test data can be gathered by applying steering pulses when the vehicle is driving on road surfaces with known friction coefficients and stored in memory. The vehicle control unit can then repeat the measurements on road surfaces with unknown friction and investigate which impulse response in the stored data that most resembles the current measurement.

The response r(t) by the vehicle will have a magnitude characteristic, such as a peak magnitude M, and a time duration T. In a low complexity implementation, these simple measurement metrics can be used to determine road friction. More complex implementations are of course also possible and may even be preferable due to increases in accuracy. Such more complex implementations may involve frequency analysis of the impulse response, possibly augmented by machine learning techniques. The estimation methods may be parameterized and generally configured by a service technician performing a vehicle software update, or regularly by the remote server 140.

Since the steering pulse is so short and small, the vehicle will not exhibit any significant motion deviation during the friction estimation process and will not veer off the road when friction estimation is performed. Rather, a short duration sound is likely to be heard and perhaps some vibration will be experienced as the measurement is repeated a number of times to improve the estimation signal quality. Thus, the methods discussed herein can be applied while the vehicle is in motion, and even when the vehicle is driving relatively fast, such as around 80 km/h or even faster.

A similar method comprises generation of a propulsion or brake pulse by one or more wheels, i.e., a temporary and small change in applied torque T from some nominal value, preferably but not necessarily followed by a more or less immediate reversal of the applied torque T back to the nominal value. The response by the vehicle to this wheel torque pulse is then recorded and subject to analysis in order to discern the current road friction conditions.

However, friction estimation based on control of steering and/or propulsion devices on the vehicle to "probe" the conditions on the road surface cannot be performed continuously, at least not without excessive inconvenience to the driver or a passenger of the vehicle from the generated noise and vibration, nor can such friction probing actuation be performed continuously without consuming a significant amount of energy, which is undesired. This type of mechanical friction estimation also results in an increased component wear, e.g., tyre wear and wear to the steering linkage on the vehicle.

An objective of the present disclosure is to present methods and arrangements which are able to detect changes in road friction, followed by reliable friction estimation using applied torque and/or steering pulses which are examples of mechanical friction estimation systems. This way the mechanical friction estimation does not have to be performed continuously, but only if a change in road friction is suspected. According to an option the mechanical friction estimation system on the vehicle can also be triggered by a detected change in normal force acting on one or more wheels on the vehicle.

Towards this end, the vehicle 100 comprises a polarimetric radar sensor system comprising one or more radar transceivers 180. The radar sensor system is directed at the ground and can also be used to determine a speed over ground of the vehicle. A ground speed radar module can be configured to determine a two-dimensional velocity vector $[v_x, v_y]$ of a heavy-duty vehicle 100 with respect to a surface or road surface supporting the vehicle 100, or just a one-dimensional velocity vector, such as the longitudinal velocity of the vehicle 100.

The principle of determining speed over ground exploited herein builds on the disclosure of US 2004/0138802. Ground speed radar systems have been proposed previously in numerous disclosures in addition to the disclosure of US 2004/0138802.

The techniques disclosed herein also build on previous work where dual polarized high carrier frequency radar signals has been used for estimating the road surface characteristics, from which the friction coefficient can be determined at least approximately. In "Road Surface Recognition at mm-Wavelengths Using a Polarimetric Radar", IEEE TRANSACTIONS ON INTELLIGENT TRANSPORTATION SYSTEMS, VOL. 23, NO. 7, July 2022, Vessen Vassilev describes a system that uses a polarimetric radar to estimate road surface conditions. This system can, e.g., be used to detect when a thin layer of ice has formed on the road surface. The system can also be used to detect when the road surface is wet, and when it is dry, at least in some cases. The disclosure also cites a number of references [1]-[10] to similar work that can be applied together with the teachings herein. A drawback with the previous work on estimating road friction using polarimetric radar is that the absolute value of the friction is hard to determine, i.e., the actual friction. This is because some high friction surfaces have similar scattering properties as low friction surfaces. However, it has been realized that changes in road friction can be more reliable detected by a polarimetric radar sensor system. The present disclosure leverages on this realization and uses the polarimetric radar friction estimation system to primarily detect change in friction. The actual friction value, i.e., the road friction condition after the change in friction, is then reliably determined by using a mechanical road friction estimation arrangement, such as one comprising a steering pulse or a wheel torque pulse.

A polarimetric radar transceiver is a dual polarized radar transceiver arranged to at least receive and detect radar backscatter in two different polarizations. Either two linear polarizations, such as horizontal and vertical, or two circular polarizations, such as right-handed circular and left-handed circular polarizations can be used in the system disclosed herein.

It is appreciated that the known systems for determining road surface characteristics such as road friction coefficient can sometimes be calibrated sufficiently well to provide the actual friction coefficient μ. However, accurate determination of the road friction coefficient based on polarimetric radar alone is not always sufficient to obtain a reliable estimate of road friction conditions.

It is appreciated that the tyres on the wheels of the vehicle 100 play a major role in determining the behavior and capabilities of the vehicle 100. A well-designed set of tyres will provide both good traction and fuel economy, while a poorly designed set of tyres, or overly worn tyres, are likely to reduce both traction and fuel economy and may even result in an unstable vehicle combination, which of course is undesired. The present disclosure also relates to software tyre models which model tyre parameters and tyre behaviors, e.g., for a given vehicle state such as a vehicle velocity, normal load, and so on. The tyre models can be used with advantage in the estimation of road friction since the properties of the tyres mounted on the vehicle 100 are of course likely to influence the response 320 by the vehicle to the steering pulse 310. For example, the tyre models disclosed herein may be used to model a relationship between a generated steering pulse 310, and/or a generated torque pulse, a vehicle response 320, and road friction conditions. For instance, a worn tyre may cause the vehicle to respond in a manner similar to the response by a vehicle having better tyres but driving on a road with lower friction coefficient, and vice versa.

The tyre models discussed herein are preferably configured to be dynamically updated as the vehicle is operated. Thus, preferably, the tyre models are dynamic and not static, which means that the tyre models will be able to better and more closely model tyre parameters in dependence of, e.g., the overall driving scenario and the state of the tyres over time as the tyre characteristics change due to wear and variation in inflation pressure and temperature.

Figure 4:
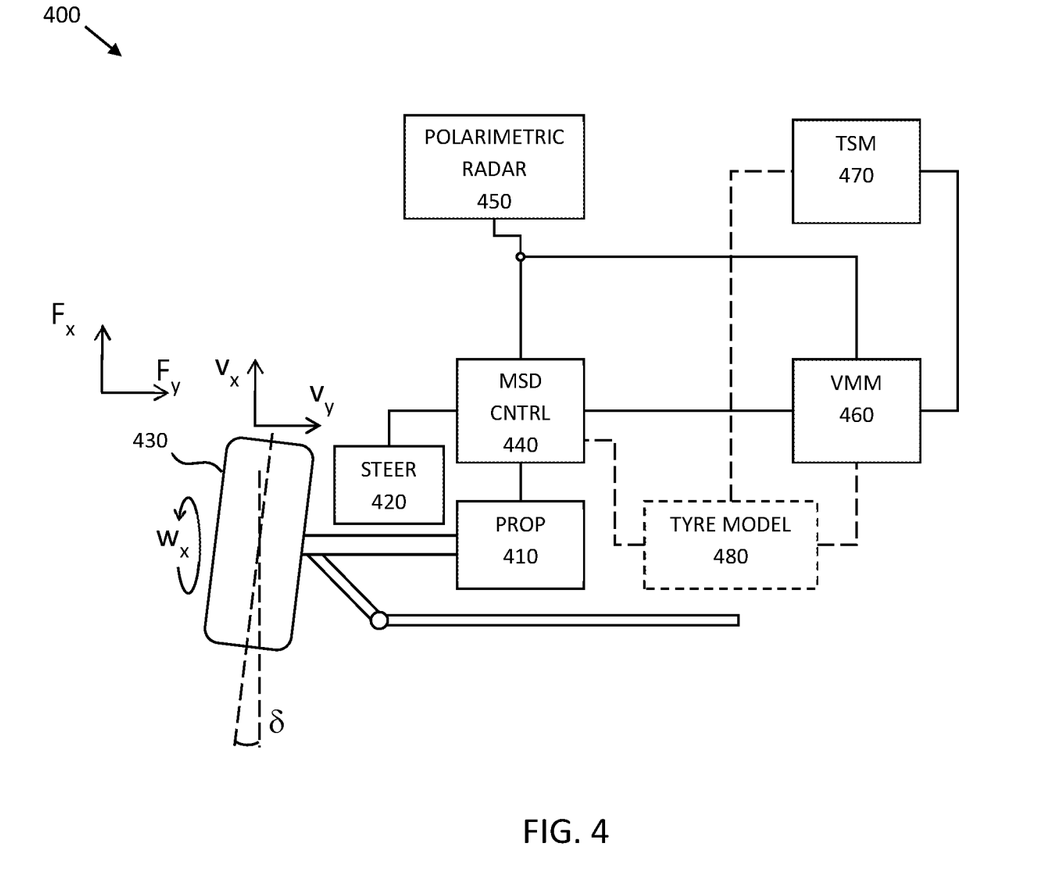
FIG. 4 schematically illustrates motion support devices for a steered axle.

FIG. 4 schematically illustrates functionality 400 for controlling a wheel 430 by some example motion support devices (MSDs) here comprising a power steering arrangement 420 and a propulsion device 410 (such as an electric machine or a combustion engine). The power steering arrangement 420 and the propulsion device 410 are examples of actuators which can be controlled by one or more motion support device control units 440, e.g., to generate control pulses to the wheel 430 in order to induce a vehicle response which can then be recorded by vehicle sensors and analyzed in order to estimate current road friction conditions.

An MSD control unit 440 may be arranged to control one or more actuators. For instance, it is not uncommon that an MSD control unit is arranged to control MSDs for both wheels of an axle. By estimating vehicle unit motion using, e.g., global positioning systems, vision-based sensors, wheel rotation speed sensors, radar sensors and/or lidar sensors, and translating this vehicle unit motion into a local coordinate system of a given wheel (in terms of, e.g., longitudinal and lateral velocity components), it becomes possible to accurately estimate wheel slip in real time by comparing the vehicle unit motion in the wheel reference coordinate system to data obtained from a wheel rotation speed sensor arranged in connection to the wheel.

The functionality 400 also comprises a friction sensing polarimetric radar arrangement 450, as discussed above. This radar arrangement is configured to detect changes in road friction. The VMM function 460 and/or the MSD control unit 440 may be configured to trigger friction estimation using an applied steering pulse and/or an applied torque pulse in order to probe the new friction conditions.

Both the steering arrangement 420 and the propulsion device 410 interacts with the road surface via the tyre of the wheel. Thus, as mentioned above, the tyre properties often have a significant impact on how the different control actions by the power steering 420 and the propulsion device 410 generate vehicle motion. A software-based tyre model 480 is therefore optionally comprised in the system 400. This tyre model provides information about the tyre currently mounted on the wheel 430, its properties, and behavioral characteristics. The tyre model may also comprise a mapping between wheel slip and generated tyre force, as discussed above in connection to FIG. 7. The VMM control unit 460 and/or the MSD control unit 440 uses the information provided by the tyre model to predict consequences of different control allocations, and to interpret the response by the vehicle to, e.g., a steering pulse in order to infer current road conditions, primarily in terms of friction. The tyre model may be implemented as a look-up table or other type of function, as discussed above. The tyre model is parameterized, i.e., defined, by one or more tyre parameters. This means that the function itself varies in dependence of the tyre properties. The tyre model can be used to model various relationships, as exemplified above, such as a relationship or mapping between a steering pulse and generated wheel force, and/or a mapping between tyre wear rate and vehicle response to an applied steering pulse for different road friction conditions. It is appreciated that the present disclosure is not limited to any particular form of tyre model structure. Rather, it is appreciated that many different types of mathematical and/or experimentally based functions and mappings can be used as the tyre model.

Figure 5:
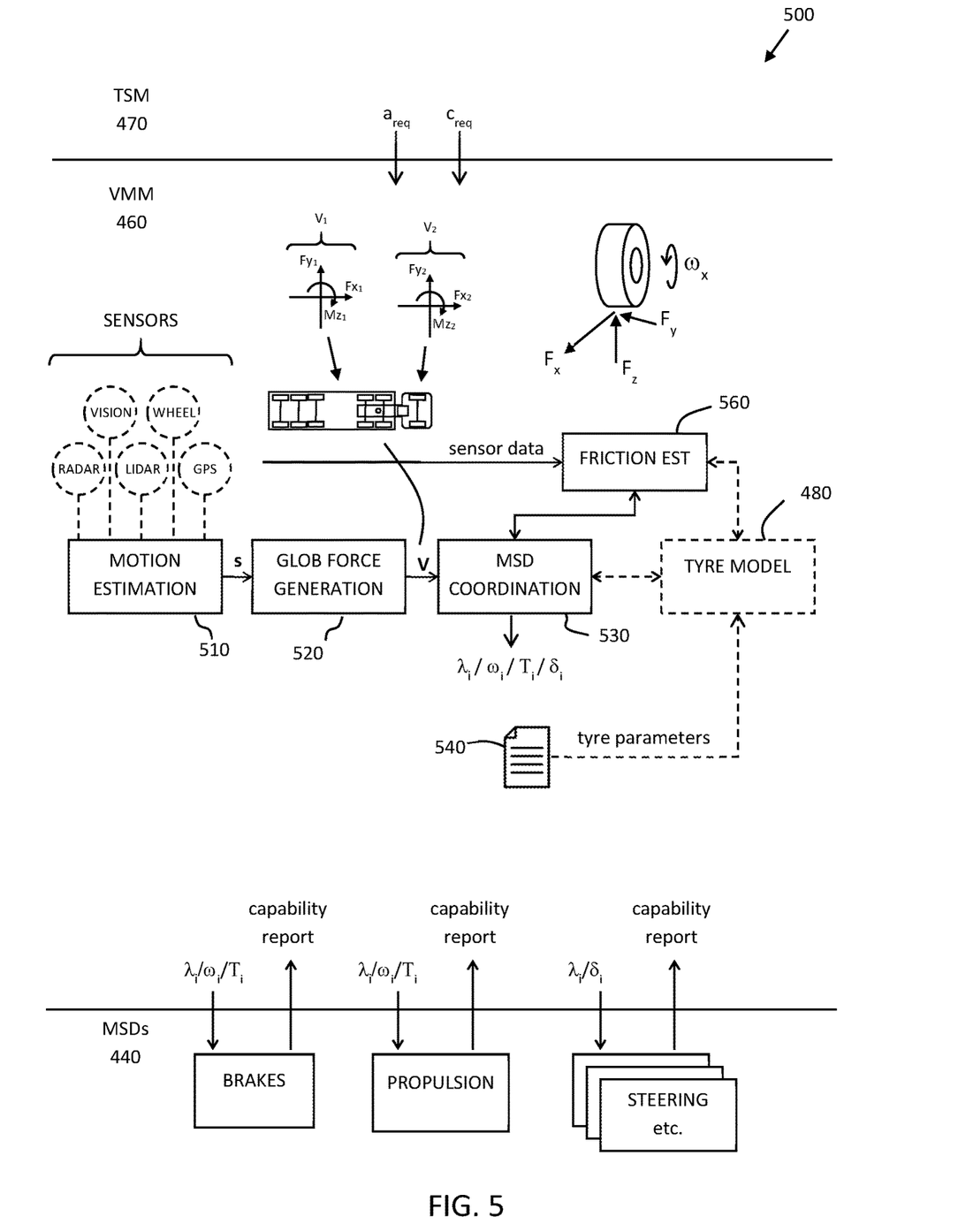
FIG. 5 shows an architecture for vehicle motion management.

With reference also to FIG. 5, a traffic situation management (TSM) function 470 plans driving operations with a time horizon of, e.g., 1-10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 460 which performs force allocation to meet the requests from the TSM in a safe and robust manner. The TSM function 470 may also optionally base the determination of vehicle maneuver on the tyre model 480, as indicated in FIG. 4.

The VMM function 460 operates with a time horizon of about 0.1-1.5 seconds or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. This control is advantageously based on current road friction data, obtained by the methods disclosed herein. With reference mainly to FIG. 5, the VMM function 460 performs vehicle state or motion estimation 510, i.e., the VMM function 460 continuously determines a vehicle state (often a vector variable) comprising positions, speeds, accelerations, yaw motions, normal forces, and articulation angles of the different units in the vehicle combination by monitoring vehicle state and behavior using various sensors 450 arranged on the vehicle 100, often but not always in connection to the MSDs.

The friction estimation methods are executed in a friction estimation module 560 which triggers generation of the steering pulse by a control signal to the MSD coordination function 530, which in turn generates the steering angle commands to the power steering arrangements on the vehicle 100 and/or torque pulses by the friction brakes or the electric machine or machines on the vehicle 100. The response by the vehicle to this actuation is measured by the sensors 450, including the torque sensor of the power steering arrangement and/or propulsion device, and sent back to the friction estimation module 560, where friction is estimated. This friction estimation system is an example of what is referred to herein as a mechanical friction estimation system.

The result of the motion estimation 510, i.e., the estimated vehicle state, is input to a global force generation module 520 which determines the required global forces on the vehicle units which need to be generated in order to meet the motion requests from the TSM 470. An MSD coordination function 530 allocates, e.g., wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100. As indicated in FIG. 5, the MSD coordination function 530 may output any of wheel slips $\lambda_i$, wheel rotation speeds $\omega$, torques $T_i$ and/or steering angles $\delta_i$ to the different MSDs.

The MSD coordination function 530 is optionally supported by a tyre model function 480 which may continuously update software-based models of the tyres on the vehicle, based at least in part on the current road friction conditions. The MSD coordination function 530 may, for instance, use the tyre model to determine a relationship between wheel slip and generated wheel force. The tyre model is parameterized by one or more tyre parameters in addition to the current road friction condition, such as tyre wear, tyre normal load, tyre slip stiffness, etc. These tyre parameters may of course be pre-configured. However, additional advantages may be obtained if the tyre parameters are estimated or otherwise determined based on tyre data obtained from memory 540 or based on tyre data obtained from one or more sensors 450.

It is appreciated that different types of vehicles respond differently to a given stimuli, very heavy vehicles will perhaps need a stronger steering pulse in order for the vehicle to exhibit a measurable response strong enough for accurately estimating road friction. Thus, according to some aspects, the time duration and/or the magnitude of the steering pulse is limited in dependence of one or more dynamic properties of the heavy-duty vehicle 100. Proper settings for the steering pulse and/or torque pulse in terms of steering angle and/or torque magnitude and time duration may, e.g., be configured at the factory when the vehicle is assembled, or regularly updated by, e.g., the remote server 140. The steering pulse and/or torque pulse may be generated as an impulse comprising an abruptly applied control change followed by an immediate reversal of the control command to its nominal value. The response by the vehicle 100 will then be an impulse response, which can be analyzed using methods which will be discussed in more detail below. An example of such a steering impulse 310 and resulting vehicle response 320 was discussed above in connection to FIG. 3. However, other forms of input steering stimuli can also be used. For instance, the applied steering pulse may be generated as a step function comprising an abruptly applied steering angle starting from a nominal steering angle. However, this type of step function steering pulse is more likely to affect the vehicle path compared to a steering impulse which comprises a reversal back to a nominal value.

With reference again to FIG. 5, the MSD coordination function 530 can also be used to compensate for the steering pulse at least partly. For instance, suppose that a large magnitude steering impulse is applied, which would cause the vehicle 100 to veer to the left if no other actions were taken. The MSD coordination function 530 is, according to some aspects, arranged to perform motion prediction, whereby it can predict the consequences of applying said steering pulse. The MSD coordination function 530 may then perform MSD coordination to compensate for the steering pulse. In other words, the method optionally comprises compensating S14 for the steering pulse by one or more other motion support devices of the vehicle 100. For instance, the veering to the left may be compensated for by applying a short duration brake torque on the right hand side of the vehicle 100, or a short duration positive torque pulse on the right hand side of the vehicle to balance up the yaw motion caused by the steering pulse. It is, however, appreciated that such vehicle motion compensation will invalidate any vehicle response measurements involving yaw motion, lateral forces, or the like. Nevertheless, it may be useful if, e.g., the main source of information for evaluating road friction is the torque applied by the power steering arrangement in order to generate the steering pulse.

It may be so that some vehicles become more sensitive to an applied steering pulse and/or torque pulse when they are moving with high speed compared to when they are moving more slowly. Consequently, the methods optionally comprise configuring the magnitude and/or the time duration of the steering pulse and/or torque pulse in dependence of a current speed of the heavy-duty vehicle 100. Generally, the faster the vehicle is moving, the more kinetic energy it stores, and the smaller the steering pulse needs to be in order to generate a response by the vehicle which is large enough to be measured and used to estimate road friction. Of course, it may also be advantageous to configure the magnitude and/or the time duration of the steering pulse and/or torque pulse in dependence of an operating environment of the heavy-duty vehicle 100. For instance, a different steering pulse magnitude and/or time duration may be suitable for estimating road friction on a gravel road at low speed compared to a freeway. The effective wheelbase of the vehicle is also likely to have an impact on the magnitude and/or the time duration of the steering pulse. For a longer wheelbase, a larger steering angle is often needed to obtain the same curvature. So, longer wheelbase vehicles can tolerate a larger steering impulse than shorter wheelbase vehicles without disturbing the motion too much.

According to the discussion above, what constitutes a limited time duration, and a limited magnitude is to be construed broadly and taking factors such as vehicle type, operating environment, and vehicle speed into account. However, for most heavy-duty vehicles, the method may comprise generating a steering pulse having a magnitude between 1-5 degrees, and preferably between 2-3 degrees, with a time duration between 0.1-1.0 seconds, and preferably between 0.2-0.5 seconds or so.

The response by the vehicle to the applied steering pulse and/or torque pulse can be measured in different ways using a single sensor or a combination of sensors. For instance, the method may comprise measuring the response by the vehicle 100 as an applied torque by a power steering system of the vehicle 100. This is one of the preferred ways to measure response by the vehicle, since it has been shown to provide relevant measurement results even or small magnitude steering pulses of limited time duration. Basically, with reference to FIG. 5, a steering angle command for a given change in steering angle is transmitted from the VMM 460 to the MSD control unit 440, which then controls the power steering arrangement to apply the change in steering angle. A command to reverse the steering angle is transmitted immediately thereafter. The power steering system then measures the applied torque required to generate the change in steering angle and records this data, e.g., as a vector of torque values sampled at sufficiently high rate, e.g., on the order of a few kHz. The data is then sent back to the friction estimation function 560 in the VMM 460 which performs an analysis in order to estimate current road friction. This analysis may be performed at different levels of complexity. For instance, a simple way to determine road friction from such torque data is to evaluate the required torque to cause the change in steering angle. If the wheel steers very easily, then the measured torque values will be relatively small, which implies low friction. On the other hand, if more significant torque is required to turn the wheel, the probable road friction is higher. This torque can also be evaluated in dependence of the current vehicle speed over ground and vehicle load, since a stationary or more slowly moving vehicle often requires more torque to change steering angle compared to a more fast-moving vehicle.

A similar operation applied if a torque pulse is used instead of or as a complement to the steering pulse. If little resistance is encountered when applying a torque pulse, i.e., if the wheel speed changes quickly then road friction is most likely smaller compared to if strong resistance by the wheel to the applied torque pulse is seen.

The methods may also comprise measuring the response by the vehicle 100 as a vehicle yaw motion resulting from the applied steering pulse and/or torque pulse, at least if the torque pulse is applied at one side of the vehicle and bot symmetrically on both sides. Naturally, if there is very little friction between the vehicle and the road, then also very little yaw motion is expected from a given steering pulse and/or torque pulse. On the other hand, if there is high friction, then this same steering pulse and/or torque pulse is likely to result in more yaw motion, at least if the vehicle is travelling at the same speed. The friction estimation function 560 may be configured with look-up tables or the like which allows for converting a recorded yaw motion resulting from a given steering pulse into an estimated road friction coefficient. These look-up tables are preferably also function of vehicle speed and/or vehicle load. In a similar manner, the methods may comprise measuring the response by the vehicle 100 as a lateral force and/or lateral acceleration generated by the applied steering pulse. Lateral acceleration is preferably measured on the steered axle of the vehicle.

The road friction conditions may be estimated from the measured response by the vehicle to the applied steering pulse in a number of different ways which can be applied independently from each other or in combination. A preferred method comprises estimating the road friction value based on a frequency analysis of the measured response. For instance, the occurrence of oscillations in the vehicle response to a steering pulse has been observed in slippery road conditions. A more resolute response with less oscillating behavior is, on the other hand, often indicative of higher road friction.

Alternatively, or as a complement, and with reference to FIG. 3, the method comprises estimating the road friction value based on a magnitude M and/or a time duration T of the measured response.

Methods involving machine learning may also be applied to the measured vehicle response to estimate current road friction conditions. Thus, the methods may comprise estimating the road friction value using a machine learning method applied to the measured response. Such methods may of course involve traditional neural networks which can be trained by measurement data obtained on stretches of road with known friction coefficients. The neural networks may be fed with raw response data and/or preprocessed measurement data, such as frequency domain representations of the measurement data. The detection mechanisms are advantageously based on machine learning techniques. Different types of machine learning techniques have been applied with success, but it has been found that algorithms based on random forest techniques are particularly effective and provide robust road friction estimation.

Random forests or random decision forests represent an ensemble learning method for classification, regression and other tasks that operate by constructing a multitude of decision trees at training time and outputting the class that is the mode of the classes (classification) or mean/average prediction (regression) of the individual trees. Random decision forests are associated with the advantage of being able to correct for decision trees' habit of overfitting to their training set. Random forests generally outperform decision tree-based algorithms. As an alternative to random forest classification methods, a less complex decision tree algorithm can be used, often referred to as regression tree algorithms, which is basically a single tree random forest algorithm.

As mentioned above, the tyres on the vehicle also impact the response by the vehicle to an applied steering pulse. Less worn tyres of course provide a better grip compared to almost worn-out tyres, which will be reflected in the response be the vehicle to a given steering pulse. Thus, advantageously, the methods optionally comprise estimating the road friction value based on a software-based model of a tyre of the vehicle 100. Examples of such software-based tyre models were discussed above. Of course, these software-based tyre models may also be updated using data obtained from the friction estimation algorithms discussed herein, i.e., the methods may comprise updating a software-based model of a tyre of the vehicle 100 based on the measured response.

The actions by the herein proposed control units are likely to be noticeable by a driver or a passenger in the heavy-duty vehicle 100, for instance, by an increased level of noise or a bit of jerky motion by the vehicle. In order to inform the driver about the reason for the noise and behavior by the vehicle, the methods may comprise triggering a notification to a driver of the vehicle in connection to generating the steering pulse. This notification may, e.g., comprise a symbol on a dashboard or the like, similar to when an anti-lock braking system (ABS) kicks in, or when an anti-skid system engages.

The methods disclosed herein are advantageously used with autonomous or semi-autonomous vehicles where no driver is present to infer road conditions based on the general feel of the vehicle and on visual inspection of the road in front of the vehicle. However, a driver of a manually operated vehicle may also wish to trigger the methods in order to determine road friction. This function can, e.g., be used by a driver which feels unsure about road conditions and wants to get a "second opinion" of if the road is slippery or if it only looks like it is slippery. This could for instance be the case if the road is covered in snow that can be wet (very slippery) or dry (not so slippery). Towards this end, the herein disclosed methods may comprise generating the steering pulse and/or torque pulse in response to a request from a driver of the vehicle 100. This request may, e.g., be generated by some form of input control, like a button or option on a touchscreen.

Figure 6:
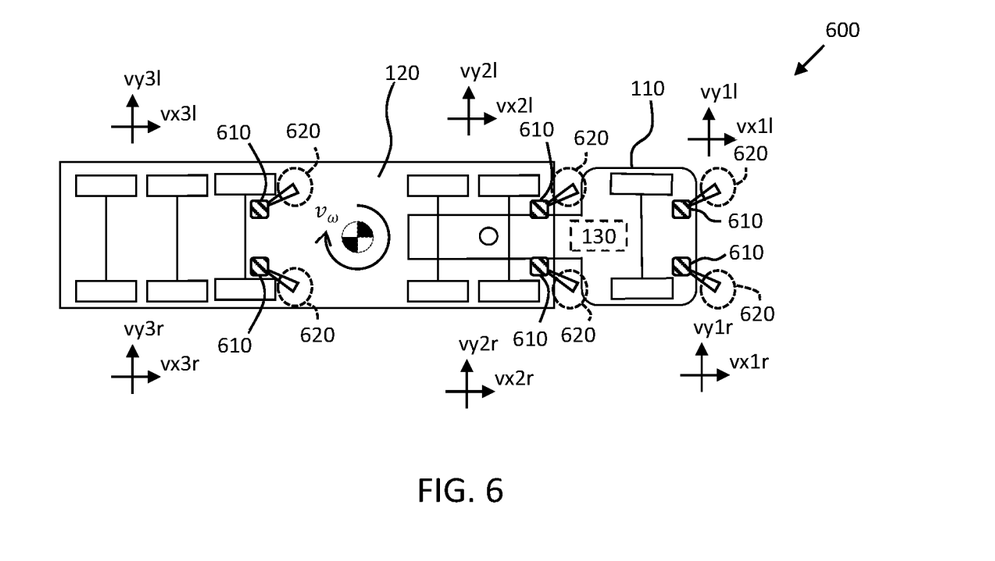
FIG. 6 shows an example heavy-duty vehicle.

FIG. 6 shows an example heavy-duty vehicle where a plurality of polarimetric radar transceivers 610 have been mounted in connection to respective wheels or groups of wheels. On this example vehicle every group of wheels, i.e., front steered wheels, rear tractor wheels, and trailer wheels, are associated with radar transceivers on the right side and left side of the vehicle. Each such radar transceiver monitors the polarimetric backscatter from an area of road surface 620 in front of the respective wheel or group of wheels, as illustrated in FIG. 6, in order to detect change in road friction. Once a change in road friction is detected in front of a given wheel of group of wheels, the secondary mechanical friction estimation system is triggered for that particular wheel or group of wheels to determine the actual road surface friction condition more reliably for that particular wheel or group of wheels. The road friction estimation system on the vehicle can then obtain reliable wheel specific road friction condition data, which is an advantage. This road friction data can also be used to estimate a wheel-specific tyre force generating capability, which can be used to refine vehicle motion management.

Figure 8:
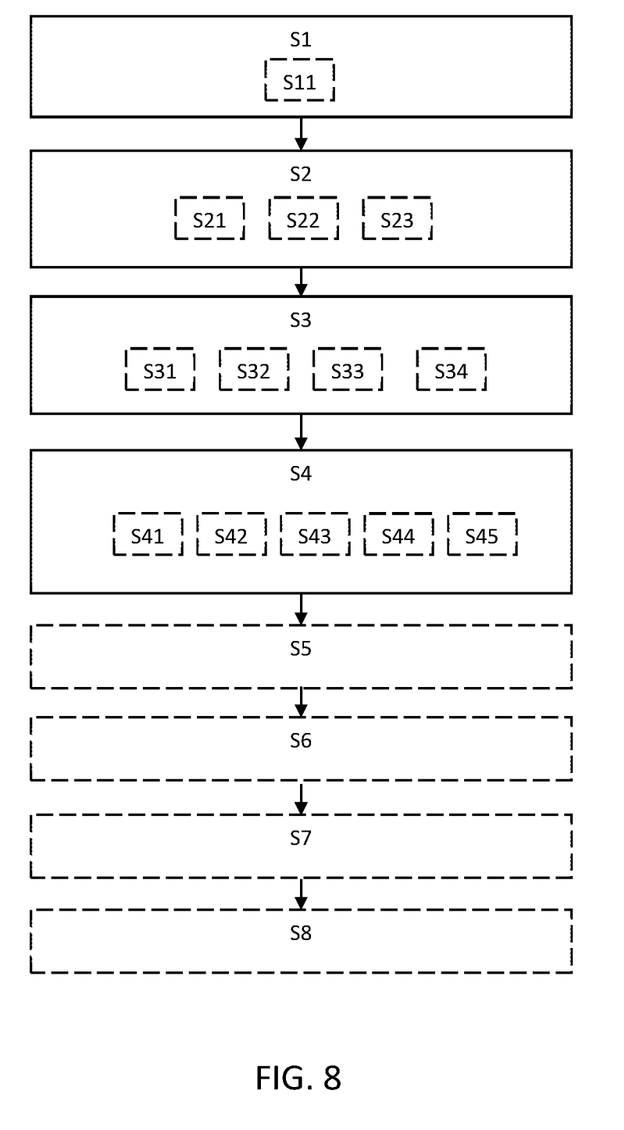
FIG. 8 is a flow chart illustrating methods.

FIG. 8 shows a flow chart that summarizes some of the teachings herein as methods. It is appreciated that the methods can be implemented in a computer system to be executed by processing circuitry, e.g., on a vehicle control unit 130. The flow chart illustrates a computer implemented method for determining a road friction condition associated with at least one wheel 150, 160, 170, 430 on a heavy-duty vehicle 100. The road friction condition may be an approximate road friction coefficient, or some other metric, such as a unitless value on some predetermined scale ranging from low friction to high friction. The method comprises transmitting S1 a radar signal 185 by at least one polarimetric radar transceiver 180 towards a surface 101 supporting the vehicle 100 and receiving backscatter from the transmitted radar signal. The radar signal 185 comprises a first polarization component and a second polarization component different from the first polarization component. According to some aspects the polarimetric radar signal is also used to determine the speed over ground of the vehicle 100, although it is appreciated that the friction estimation function is not inextricably linked to the ground speed estimation function. The method also comprises processing S2 the received backscatter by a processing device 130 to determine a friction parameter related to the road friction condition of the surface 101, monitoring S3 the friction parameter over time to detect change in the friction parameter, and in case change in the friction parameter is detected, triggering S4 friction estimation by a secondary physical friction estimation system.

Change in the friction parameter may, e.g., comprise comparing a difference in the friction parameter compared to some nominal value to a threshold value. More advanced detection criteria can of course also be implemented. The change detection criteria can be determined by practical experimentation and/or by computer simulation.

To detect change in the friction parameter, a test statistic can be determined as a predetermined function of the friction parameter. This test statistic can be monitored over time to detect change. The change in the friction parameter can be measured relative to some nominal value of the friction parameter. Once a change in the friction parameter has been determined, a new nominal friction parameter value can be configured and the monitoring can then proceed based on this new nominal friction parameter value. The skilled person understands that change in the friction parameter can be implemented in several different ways, and that the present disclosure is not limited to any particular way of detecting change in the friction parameter.

The secondary physical friction estimation system may comprise, e.g., generation of a steering pulse S41, generation of a propulsion torque pulse S42, and/or generation of a brake torque pulse S43, as discussed above. More than one mechanical actuation can be used to determine road friction by the secondary physical friction estimation system, e.g., a combination of a steering pulse and a torque pulse. Such a combination can be used to compensate for the impact on the motion of the vehicle by the secondary friction estimation system. A steering pulse can, for instance, be combined with differential propulsion or braking on the sides of the vehicle to compensate for the yaw motion induced by the steering pulse. A propulsion torque pulse can be offset by a braking torque pulse in a similar manner. The MSD coordination function 530 discussed above in connection to FIG. 5 can for instance be used to realize these aspects of the method.

The torque pulse is advantageously generated by an electric machine S44 of the heavy-duty vehicle 100. Electric machines can be used with advantage in this application, since they are normally possible to operate at high bandwidth, i.e., they can be used to generate short time duration distinct torque pulses. The electric machines can also be used to monitor the response by the wheel to the applied torque pulse. Electric machines are already available on many vehicles, which can be retrofitted with polarimetric radar systems and updated software and consequently enabled to execute the advanced friction estimation methods discussed herein, which is an advantage.

A brake torque pulse can also be generated by an electromechanical brake device S45, which is normally also possible to actuate at high bandwidth.

Aspects of the computer implemented methods discussed herein relates to friction estimation, where the friction parameter that is monitored comprises 2-port scattering parameters of the road surface 101 at the first and second polarizations S21, as discussed in "Road Surface Recognition at mm-Wavelengths Using a Polarimetric Radar", IEEE TRANSACTIONS ON INTELLIGENT TRANSPORTATION SYSTEMS, VOL. 23, NO. 7, July 2022. The friction parameter can also be related to a scatter coherence matrix of the received backscatter S22, to a target entropy, and/or to a polarimetric pedestal of the backscatter radar signal S23. Other friction parameters can of course also be defined and used with similar effect.

The friction parameter that is monitored over time in order to detect change in the friction parameter can be any of 2-port scattering parameters of the road surface 101 at the first and second polarizations, the scatter coherence matrix of the received backscatter, target entropy, and/or polarimetric pedestal of the backscatter radar signal. A function of said metrics can also be used to detect change. A suitable function can be determined based on practical experimentation and/or based on computer simulation of the interaction between polarimetric radar signals and various road surfaces.

Generally, the skilled person understands that the backscatter from the transmitted polarimetric radar signal is first processed in order to determine a suitable friction parameter. Change in this friction parameter is then detected by comparing this friction parameter, or a function thereof, to some nominal value. If the value deviates by more than a set amount, or if some other more advanced detection criterion is fulfilled, then change is detected. The article "Road Surface Recognition at mm-Wavelengths Using a Polarimetric Radar", IEEE TRANSACTIONS ON INTELLIGENT TRANSPORTATION SYSTEMS, VOL. 23, NO. 7, July 2022, discusses various metrics that can be used to determine road friction conditions. Any of these metrics can be monitored over time and compared to corresponding nominal values. In case the monitored metric deviates by more than some predetermined amount, then change is detected.

According to some aspects, the computer implemented method also comprises monitoring S5 a normal force associated with one or more wheels on the vehicle 100 over time to detect change in the normal force, and in case change in the normal is detected, triggering S6 friction estimation by the secondary physical friction estimation system. Normal force can be measured in a number of ways, such as by monitoring bellow pressure in a suspension system of the vehicle 100, by monitoring a distance to ground of the heavy-duty vehicle chassis, and/or by measuring linear displacement of a suspension of the vehicle 100. A change in normal force is relevant to, e.g., the ability to generate tyre force, as was discussed above in connection to FIG. 7. A change in normal force may give similar effects as a change in road friction and is thus also relevant to VMM functions and MSD control.

The computer implemented methods discussed herein may furthermore comprise determining S7 a wheel force generating capability based on the friction estimation by the secondary physical friction estimation system, e.g., based on a tyre model that is parameterized by road friction.

The computer implemented methods discussed herein may also comprise updating S8 the tyre model based on the friction estimation by the secondary physical friction estimation system.

The computer implemented methods discussed herein may also comprise transmitting S11 radar signals 185 by a plurality of polarimetric radar transceivers 180 towards the surface 101 supporting the vehicle 100, and receiving backscatter from the transmitted radar signals, where each transmitted radar signal is associated with a respective wheel or group of wheels on the vehicle 100. This was discussed above in connection to FIG. 6. By using a plurality of polarimetric radar transceivers 180 in this manner, a wheel specific road friction condition can be determined, or at least a wheel group specific road friction condition. Vehicle motion management and actuator control can then be tailored per wheel, or at least per wheel group, considering the current road friction at that specific wheel or group of wheels, which is an advantage.

Figure 9:
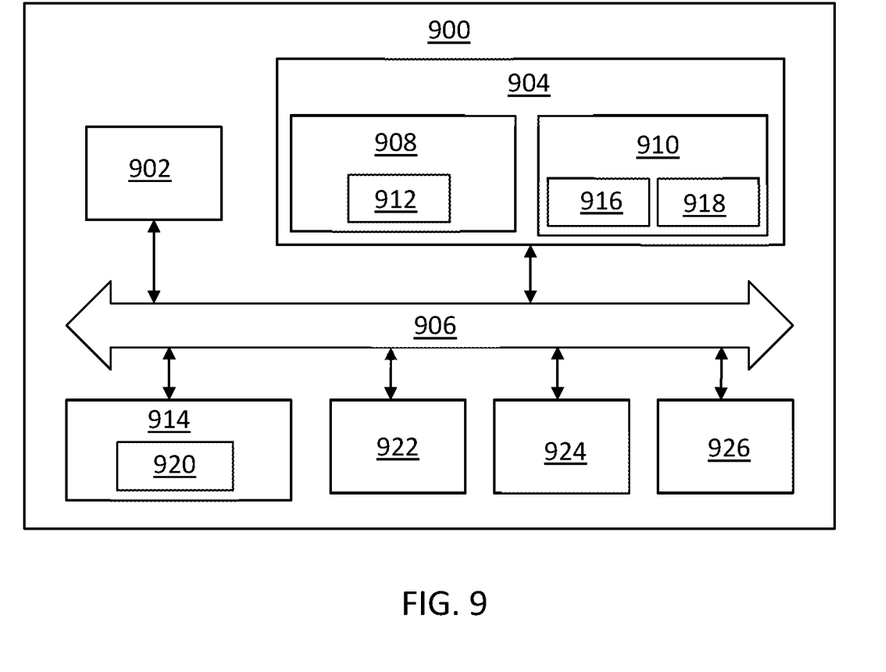
FIG. 9 is a schematic diagram of an exemplary computer system for implementing examples disclosed herein.

FIG. 9 is a schematic diagram of a computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include processing circuitry 902 (e.g., processing circuitry including one or more processor devices or control units), a memory 904, and a system bus 906. The computer system 900 may include at least one computing device having the processing circuitry 902. The system bus 906 provides an interface for system components including, but not limited to, the memory 904 and the processing circuitry 902. The processing circuitry 902 may include any number of hardware components for conducting data or signal processing or for executing computer code stored in memory 904. The processing circuitry 902 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 902 may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures, and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A computer implemented method for determining a road friction condition associated with at least one wheel on a heavy-duty vehicle, the method comprising
    transmitting a radar signal by at least one polarimetric radar transceiver towards a surface supporting the vehicle, and receiving backscatter from the transmitted radar signal, where the radar signal comprises a first polarization component and a second polarization component different from the first polarization component,
    processing the received backscatter by a processing device to determine a friction parameter related to the road friction condition of the surface,
    monitoring the friction parameter over time to detect change in the friction parameter, and
    in case change in the friction parameter is detected,
    triggering friction estimation by a secondary physical friction estimation system.

2. The computer implemented method according to claim 1, where the secondary physical friction estimation system comprises generation of a steering pulse.

3. The computer implemented method according to claim 1, where the secondary physical friction estimation system comprises generation of a propulsion torque pulse.

4. The computer implemented method according to claim 1, where the secondary physical friction estimation system comprises generation of a brake torque pulse.

5. The computer implemented method according to claim 3, where the torque pulse is generated by an electric machine.

6. The computer implemented method according to claim 4, where the brake torque pulse is generated by an electro-mechanical brake device.

7. The computer implemented method according to claim 1, where the friction parameter comprises 2-port scattering parameters of the road surface at the first and second polarizations.

8. The computer implemented method according to claim 1, where the friction parameter is related to a scatter coherence matrix of the received backscatter.

9. The computer implemented method according to claim 1, where the friction parameter is related to a target entropy and/or a polarimetric pedestal of the backscatter radar signal.

10. The computer implemented method according to claim 1, comprising monitoring a normal force associated with one or more wheels on the vehicle over time to detect change in the normal force, and
    in case change in the normal is detected,
    triggering friction estimation by the secondary physical friction estimation system.

11. The computer implemented method according to claim 1, comprising determining a wheel force generating capability based on the friction estimation by the secondary physical friction estimation system.

12. The computer implemented method according to claim 1, comprising updating a tire model based on the friction estimation by the secondary physical friction estimation system.

13. The computer implemented method according to claim 1, comprising transmitting radar signals by a plurality of polarimetric radar transceivers towards the surface supporting the vehicle, and receiving backscatter from the transmitted radar signals, where each transmitted radar signal is associated with a respective wheel or group of wheels on the vehicle.

14. A computer program product comprising program code for performing, when executed by processing circuitry, the method of claim 1.

15. A non-transitory computer-readable storage medium comprising instructions, which when executed by processing circuitry, cause the processing circuitry to perform the method of claim 1.

16. A road friction estimation system for a heavy-duty vehicle, comprising at least at least one polarimetric radar transceiver and a processing device configured to determine a road friction condition associated with at least one wheel on the heavy-duty vehicle,
    where the radar transceivers are polarimetric radar transceiver arranged to transmit respective radar signals towards a surface supporting the vehicle, and to receive backscatter from the transmitted radar signals, where the radar signals comprise respective first and second different polarization components,
    where the processing device is arranged to process the received backscatter to determine at least one friction parameter related to the road friction condition of the surface,
    where the processing device is arranged to monitor the friction parameter over time to detect change in the friction parameter, and
    in case change in the friction parameter is detected,
    trigger friction estimation by a secondary physical friction estimation system.

17. A heavy-duty vehicle comprising a road friction estimation system according to claim 16.

* * * * *